June 21, 1955 M. E. WILKE 2,711,437
DEFERRED-ACTION PRIMARY CELL
Filed July 13, 1953
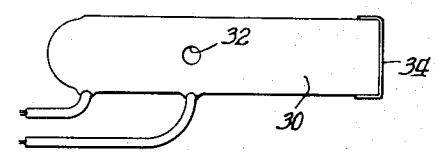
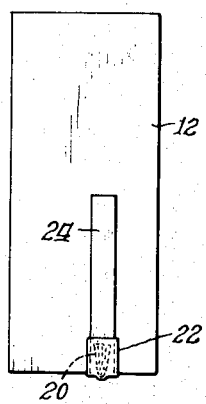
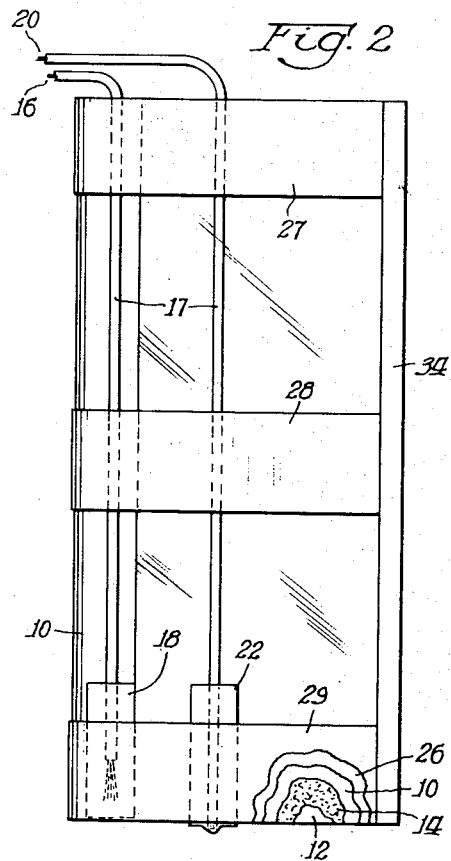
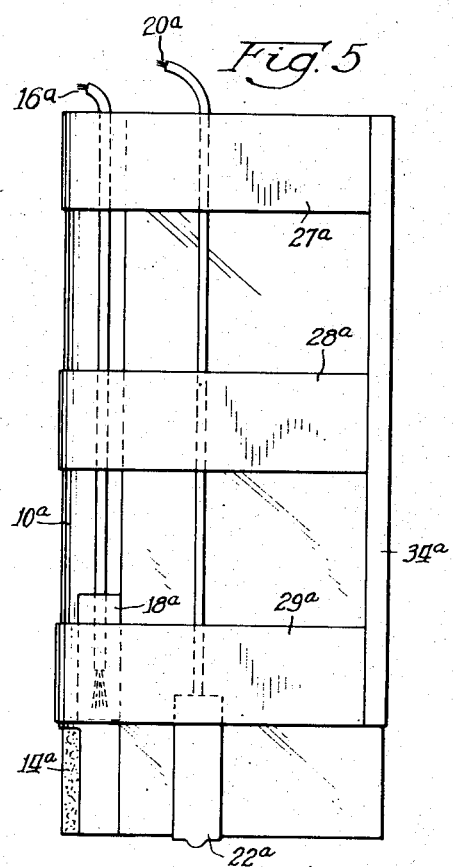
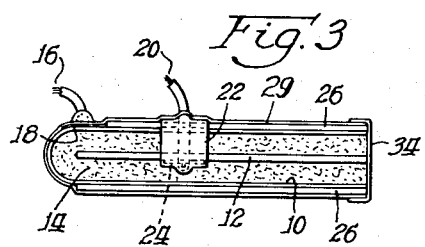
Inventor:
Milton E. Wilke
By Jones, Tesch + Darby
Attys.

United States Patent Office 2,711,437
Patented June 21, 1955

2,711,437

DEFERRED-ACTION PRIMARY CELL

Milton E. Wilke, Freeport, Ill., assignor to Burgess Battery Company, Freeport, Ill., a corporation of Delaware Application July 13, 1953, Serial No. 367,683

8 Claims. (Cl. 136—90)

This invention relates to deferred-action primary cells and particularly to deferred-action primary cells which are adapted to be rendered operative by immersion in a body of activating liquid.

There are many applications where signal apparatus and other apparatus, which may be of electronic or other character, is powered by a deferred-action battery, and the practical or convenient method of activation is by immersion of the battery in a body of activating liquid. Such activating liquid may be a suitable aqueous solution or it may be water, such as tap water, the fresh water of a lake or other body of water, or the salt water of the ocean.

Deferred-action batteries adapted for activation by immersion in a body of activating liquid are known, and the cells thereof each usually consists of an anode and a cathode separated from each other by a porous, absorbent, electrolyte-receptive body which, upon immersion in the activating liquid, absorbs such liquid and thereby renders the cell and battery operative.

The present invention has for its object the provision of an improved construction for deferred-action cells of the character described whereby the absorption of the activating liquid is more thorough and effective and the operation of the cell is improved and its capacity for delivering electrical energy is increased.

Other objects and advantages will become apparent as the following description progresses in which several embodiments of the invention are described. Such description is to be taken in conjunction with the accompanying drawings, in which Figs. 1, 2 and 3 are top, side and bottom views, respectively, of an embodiment of the cell of the present invention;

Fig. 4 is a side view of the depolarizing cathode of said embodiment, and

Fig. 5 is a side view of a different embodiment of the invention.

Referring to the embodiment of Figs. 1 to 4, the anode 10 is a relatively large sheet of magnesium bent or folded longitudinally at its mid-section into the shape of a U, as is best seen in Fig. 3. Spaced from the anode 10 is the depolarizing cathode 12 which is a sheet of silver chloride arranged mid-way between the legs of the U of anode 10 and in spaced parallel relation to said legs. The sheet-form cathode 12 is formed by rolling or otherwise compressing a mass of silver chloride under heavy pressure whereby it is formed into a sheet having sufficient coherence for the purpose.

Arranged on both sides of the cathode 12 and between said cathode and the anode 10 and serving to space the anode and cathode apart is the porous, absorbent, electrolyte-receptive element 14. Element 14 is a sheet-form body of loosely felted cellulose fibers, which may be wood or cotton fibers. The body 14 is of a porous or interstitial structure similar to that of the well-known absorbent cotton batting, whereby it has strong absorbent properties when brought into contact with the activating liquid.

The terminal conductor 16 is connected to the anode 10 as by welding the end of said conductor to said anode. Conductor 16 is connected to the exterior surface of the anode 10 adjacent to the bottom of the cell and extends upwardly upon the exterior of the cell as shown. For protection against the activating liquid into which the cell may be immersed, conductor 16 has the insulating electrolyte-resistant covering 17, and the bare connected portion of the conductor is covered with the electrolyte-resistant dielectric tape 18 having a pressure-sensitive adhesive upon one surface thereof, said tape being adhesively attached to the surface of the anode 10. The second insulated terminal conductor 20 is similarly connected to the cathode 12, and is bent around the bottom edge of the cathode and extends laterally to the exterior of the cell and then upwardly. The connected end portion of conductor 20 is protected by the tape 22 which for strength extends upwardly a distance on the exterior of the cell. For the purpose of making a good conductive connection to the cathode 12, a thin strip of silver foil 24 is first attached and electrically connected to the surface of the cathode (see Fig. 4) by a suitable method such as spot welding, and the conductor 20 is connected as by welding to the strip 24.

For mechanical strength and protection, the exterior surfaces of the legs of the U-shaped anode 10 are covered by the plates 26 which may be composed of any stiff dielectric material, such as synthetic resin, a suitable example being polystyrene. At its mid-section and upper and lower sections, the described cell, including the exterior plates 26, is encircled horizontally by the electrolyte-resistant tapes 27, 28 and 29 which have a coating of pressure-sensitive adhesive upon their interior surfaces whereby they are in adherent relation to the surfaces with which they make contact. The upper tape 27 not only extends about the lateral exterior surface of the cell but also extends over the top of the cell to form the top covering 30 shown in Fig. 1, said covering having the opening 32 therein for the egress of air during immersion in the activating liquid. A description and discussion of opening 32 will be given hereinafter. The bottom tape 29 does not extend over the bottom end of the cell, but said end of the cell is left open for the entrance of activating liquid upon immersion of the cell for activation purposes, as is shown in Fig. 3. The side of the cell to the left as viewed in Fig. 2 is closed by the anode 10, the base of the U forming the closure along this side. The other side of the cell is closed by the tape 34, which is similar to the tapes 27, 28 and 29 and is stretched over the space between the legs of the anode along said side and the margins of the tape are folded against the margins of the exterior surfaces of said legs, and the tape is held firmly in place by adhesive union with the contacting surfaces of said anode. The tape 34 covers the portions of tapes 27, 28 and 29 which extend over the open end of the U-shaped anode. The electrolyte-resistant tapes 18, 22, 27, 28, 29, 30 and 34 may be composed of cloth fabric or paper impregnated with an electrolyte-resistant substance such as polystyrene. The conductor 16 extends upwardly upon the exterior of the anode 10 adjacent to the edge of front plate 26, as seen in Fig. 2, said plate being narrower than the back plate 26 to accommodate the conductor. Conductor 20 extends upwardly upon the exterior surface of the front plate 26. Both conductors are conveniently held in position by being caused to pass underneath the tapes 27, 28 and 29.

For activation, the cell is immersed in a body of activating liquid, which may be a dilute solution of a suitable salt, such as sodium chloride, or may be either fresh water or the salt water of the ocean. An advantage of the cell of the present invention is that it can be activated in an entirely satisfactory manner by immersion in plain water. The cell is immersed with the bottom downward, the usual arrangement being to place the cell, or a battery of the cells, in a container which is arranged to permit the in-flow of water upon immersion, and the container or the cell or the battery is equipped with means for keeping the bottom of the cell or cells spaced above the bottom of the container.

Cells have been known which are of the general structure heretofore described, but in which all of the edges of the absorbent electrolyte-receptive element, or all of the edges except that which is closed by the fold of the anode, are exposed to the activating liquid upon immersion. It was found that such a cell or battery did not deliver energy up to the capacity which was expected of it and, upon analysis, it was found that an area of the absorbent element, usually near the middle of the cell was not moistened by the activating liquid. As a consequence, the available material of the anode and cathode was not fully utilized in the energy-delivering operation of the cell. It was found that by closing all of the edges of the electrolyte-receptive element except the bottom edge to the entrance of activating liquid and providing a small opening in the covering at the top edge, the difficulty is overcome and the activating liquid thoroughly moistens the absorbent element throughout its entire volume and full utilization is made of the material of the anode and cathode.

The reason for the previous difficulty and its solution by the structure of the present invention is believed to be as follows. A capillary attraction is created by the interstitial absorbent element such that when a cell having the absorbent element exposed along all edges is immersed, the activating liquid is drawn inwardly at all edges and forms an encircling wall which progresses inwardly until the contained air in the interstices is confined in a pocket and prevents the activating liquid from moistening the electrolyte-receptive element at the location of the pocket. The construction of the present invention, by providing a covering for all of the edges of the electrolyte-receptive element except the bottom, prevents the influx of liquid from all edges and the formation of an air-pocket. The liquid is absorbed from the bottom only and progressively rises and moistens the material of the receptive element, pushing the air upwardly before it and out of the opening 32. In order that an undesirable influx of liquid at the top be prevented, the opening 32 should be kept small. The size of the opening should be such that the air being displaced from the interstices of the material passes through opening 32 under sufficient pressure that the influx of liquid at said opening is prevented. In practice, with a cell in which the absorbent element has a bottom edge area of approximately one square inch open and exposed for the entrance of activating liquid, the opening 32 should not exceed approximately one-fourth inch in diameter. Several small openings may be used in place of the single opening 32, in which case the aggregate open area, for the cell described, should not exceed the equivalent of that of an opening having a diameter of approximately one-fourth inch, or an area of approximately .05 square inch. The amount of air being displaced by the influx of liquid at the bottom depends upon the area which is open for the influx of liquid, and the total area of the opening or openings at the top for the egress of air should not exceed approximately .05 times the open area at the bottom for the entrance of activating liquid.

In accordance with the present invention, there is therefore provided a deferred-action cell in which the anode and cathode cover the broad surfaces of the porous, absorbent, electrolyte-receptive element and coverings are provided upon all edges except the bottom edge of the electrolyte-receptive element whereby the bottom edge is open and the other edges are closed to the entrance of activating liquid during immersion in activating the cell, and the covering upon the top edge of the receptive element has a restricted area thereof open for the egress of air during immersion.

The performance of the cell is not appreciably impaired if the coverings along the side edges of the cell are absent for a restricted distance up from the bottom of the cell. An embodiment which incorporates such a modification is illustrated in Fig. 5. This embodiment is similar to that of Figs. 1 to 4 with certain differences which will be described, and the same numerals are used in Fig. 5 to designate parts corresponding to the parts of the embodiment of Figs. 1 to 4, with the addition of the suffix "a." The differences are that the bottom tape 29a is spaced upwardly a substantial distance from the bottom of the cell; the side-enclosing tape 34a does not cover the bottom portion of the side edge of the absorbent element, that is, the portion below tape 29a; the fold or bend at the base of the U of the anode 10a is removed below tape 29a, whereby the bottom portions of the side edges of the electrolyte-receptive member 14a are uncovered and open to the inflow of activating liquid; and the conductor 16a is connected to anode 10a at a point higher than in the cell of Figs. 1 to 4. As stated heretofore, the length of the open portions of the side edges, as measured upwardly from the bottom of the cell, should not exceed a distance equal to one-half of the length of the open bottom of the cell.

While but two embodiments of the cell of the invention have been described, other variations may be made within the spirit of the invention. For example, the opening 32 for the egress of air may be located in the portion of the covering for a side edge of the absorbent element adjacent to the top of said element, instead of in the covering for the top edge. Also, a few separated small openings in the coverings for the side edges of the absorbent element do not appreciably impair the improved operation of the cell and such coverings are considered to substantially close the side edges of the absorbent element against the inflow of liquid. Also, the anode 10 may be composed of zinc instead of magnesium, and the depolarizing cathode may be composed of cuprous chloride instead of silver chloride, in which case the strip 24 may be composed of copper instead of silver. As another possible variation, the invention is not restricted to the shape and configuration of cell which are described and illustrated, but other shapes and configurations may be used as will occur to those skilled in the art.

What is claimed is:

1. A deferred-action cell adapted for activation by immersion in a body of activating liquid, comprising a plurality of cell elements in juxtaposed relation including an anode and a cathode and a porous, absorbent, electrolyte-receptive element between said anode and cathode, said anode and cathode covering broad surfaces of said electrolyte-receptive element, coverings for the remainder of the surfaces of said electrolye-receptive element except for a substantial surface area at the bottom portion of said element, whereby said area is open and the remainder of the surfaces of said electrolyte-receptive element are closed to the entrance of activating liquid during said immersion in activating liquid, the covering for the top portion of said electrolyte-receptive element having a restricted area thereof open for the egress of air during said immersion.

2. A deferred-action cell as claimed in claim 1 in which the open area in the covering for the top portion of the electrolyte-receptive element is of a size such that air is exhausted therethrough but activating liquid does not enter during the immersion operation.

3. A deferred-action cell as claimed in claim 1 in which the open area of the covering for the top portion of the electrolyte-receptive element does not exceed approximately .05 square inch.

4. A deferred-action cell as claimed in claim 1 in which the open area of the covering for the top portion of the electrolyte-receptive element does not exceed approximately .05 times the open area in the covering for the bottom portion of the electrolyte-receptive element.

5. A deferred-action cell adapted for activation by immersion in a body of activating liquid, comprising a plurality of cell elements in juxtaposed sandwich-like relation including an anode and a cathode and a porous, absorbent, electrolyte-receptive element between said anode and cathode, said anode and cathode covering the broad surfaces of said electrolyte-receptive element, coverings for all edges except the bottom edge of said electrolyte-receptive element whereby said bottom edge is open and the other edges are closed to the entrance of activating liquid during said immersion in activating liquid, said covering for the top edge of said electrolyte-receptive element having a restricted area thereof open to permit egress of air during said immersion.

6. A deferred-action cell adapted for activation by immersion in a body of activating liquid, comprising a plurality of flat cell elements in juxtaposed sandwich-like relation including an anode and a cathode and a porous, absorbent, electrolyte-receptive element between said anode and cathode, said anode and cathode covering the broad surfaces of said electrolyte-receptive element, coverings for all edges except the bottom edge of said electrolyte-receptive element whereby said bottom edge is open and the other edges are closed to the entrance of activating liquid during said immersion in activating liquid, said covering for the top edge of said electrolyte-receptive element having a restricted area thereof open to permit the egress of air during said immersion.

7. A deferred-action cell adapted for activation by immersion in a body of activating liquid, comprising a plurality of flat cell elements in juxtaposed sandwich-like relation including an anode and a cathode and a porous, absorbent, electrolyte-receptive element between said anode and cathode, said anode and cathode covering the broad surfaces of said electrolyte-receptive element, the bottom edge of said electrolyte-receptive element being open to the surrounding space, coverings upon the top edge of said electrolyte-receptive element and upon the side edges thereof to a point spaced above said bottom edge a distance not more than one-half the length of said bottom edge, whereby said top edge and the covered portions of said side edges are closed and said bottom edge is open to the entrance of activating liquid during said immersion in activating liquid, said covering for the top edge of said electrolyte-receptive element having a restricted area thereof open to permit the egress of air during said immersion.

8. A deferred-action cell adapted for activation by immersion in a body of activating liquid, comprising a plurality of cell elements in juxtaposed sandwich-like relation including an anode and a cathode and a porous, absorbent, electrolyte-receptive element between said anode and cathode, said anode and cathode covering the broad surfaces of said electrolyte-receptive element, coverings for all except one of the edges of said electrolyte-receptive element whereby said one edge is open and the other edges are closed to the entrance of activating liquid during said immersion in activating liquid, said covering for the edge of said electrolyte-receptive element opposite said open edge thereof having a restricted area thereof open for the egress of air during said immersion.

References Cited in the file of this patent

UNITED STATES PATENTS

| | | |
|---|---|---|
| 2,070,818 | Winckler | Feb. 16, 1937 |
| 2,594,879 | Davis | Apr. 29, 1952 |
| 2,637,756 | Coleman et al. | May 5, 1953 |
| 2,637,757 | Wilke | May 5, 1953 |
| 2,669,596 | Nelson | Feb. 16, 1954 |